US00RE43349E

(19) United States
(12) Reissued Patent
Dunn et al.

(10) Patent Number: US RE43,349 E
(45) **Date of Reissued Patent: *May 8, 2012**

(54) BOTTLE RACK

(76) Inventors: Steven B. Dunn, Beverly Hills, CA (US); Tor H. Petterson, Rancho Palos Verdes, CA (US); Grace C. Petterson, legal representative, San Pedro, CA (US)

( * ) Notice: This patent is subject to a terminal disclaimer.

(21) Appl. No.: 09/902,965

(22) Filed: Jul. 11, 2001

Related U.S. Patent Documents

Reissue of:
(64) Patent No.: 6,125,548
Issued: Oct. 3, 2000
Appl. No.: 09/513,094
Filed: Feb. 25, 2000

U.S. Applications:
(63) Continuation of application No. 09/113,868, filed on Jul. 10, 1998, now Pat. No. 6,038,784.

(51) Int. Cl.
*F26B 25/18* (2006.01)

(52) U.S. Cl. ..... 34/104; 34/107; 211/41.6; 211/74; 248/102

(58) Field of Classification Search ..... 34/437, 34/104, 105, 106, 107; 211/41.3, 41.5, 41.6, 211/71.01, 74, 181.1, 70.7, 85.18, 85.25, 211/41.4; 248/102
See application file for complete search history.

(56) References Cited

U.S. PATENT DOCUMENTS

| | | | | |
|---|---|---|---|---|
| 499,881 | A | 6/1893 | Goldstein | |
| 990,454 | A * | 4/1911 | Peters | 211/41.5 |
| 1,412,592 | A * | 4/1922 | Allsop et al. | 211/153 |
| 1,822,087 | A * | 9/1931 | Feingold | 211/198 |
| 1,971,523 | A * | 8/1934 | Feingold | 211/41.5 |

(Continued)

FOREIGN PATENT DOCUMENTS

| | | |
|---|---|---|
| CH | 685919 A5 | 11/1995 |

(Continued)

OTHER PUBLICATIONS

Product Literature of Safety 1st entitled "Bottle & Nipple Drying Rack," 1996.*

(Continued)

*Primary Examiner* — Stephen M. Gravini
(74) *Attorney, Agent, or Firm* — Robert Z. Evora; John L. Knoble

(57) ABSTRACT

An apparatus for drying and storing an article, such as a baby bottle, after washing and rinsing includes a tray having a bottom face that is adapted to be supported by an underlying surface such as a counter-top, and an upper face. A plurality of pegs extend out from the upper face, and each peg is sized and arranged so as to be able to support an article, such as a baby bottle, after washing and rinsing. Each peg is mounted to the tray in such a manner as to be movable between a first storage position, wherein the entire peg is positioned relatively close to the upper face for storage and packaging, and a second, operative position. This permits the apparatus to be conveniently folded for packaging and storage purposes. Another aspect of the apparatus involves disk holding structure, connected to the upper face of the tray, for holding baby bottle disks in a location that is isolated from areas of the tray in which liquid may collect. This permits baby bottle disks to be dried and stored in a safe manner at a location that is convenient to a location at which baby bottles are being dried.

4 Claims, 3 Drawing Sheets

U.S. PATENT DOCUMENTS

| | | | | | |
|---|---|---|---|---|---|
| 2,039,927 | A | | 5/1936 | Poglein | |
| 2,295,736 | A | | 9/1942 | Jernson | |
| 2,419,040 | A | | 4/1947 | Stepanian | |
| 2,441,417 | A | | 5/1948 | Hopkins | |
| 2,455,848 | A | | 12/1948 | Young | |
| 2,472,028 | A | | 5/1949 | Son | |
| 2,516,088 | A | * | 7/1950 | Einhorn | 211/41.5 |
| 2,841,288 | A | * | 7/1958 | Field et al. | 211/41.4 |
| 2,879,900 | A | | 3/1959 | Fox | |
| 2,936,898 | A | | 5/1960 | Miguez | |
| 3,126,098 | A | * | 3/1964 | Geiger et al. | 211/41.8 |
| 3,289,854 | A | * | 12/1966 | Kauffman | 211/41.9 |
| 3,321,262 | A | * | 5/1967 | Mogler | 312/294 |
| 3,388,808 | A | * | 6/1968 | Radek | 211/132.1 |
| 3,451,556 | A | * | 6/1969 | Macoicz | 211/41.9 |
| 3,464,566 | A | * | 9/1969 | Gilson | 211/41.2 |
| 3,486,804 | A | * | 12/1969 | Kauffman et al. | 312/228.1 |
| 3,587,865 | A | | 6/1971 | Phillips | |
| 3,730,354 | A | | 5/1973 | Bronstein | |
| 3,752,322 | A | * | 8/1973 | Fiocca et al. | 211/41.8 |
| 3,901,728 | A | * | 8/1975 | Opal | 134/25.2 |
| 4,193,588 | A | | 3/1980 | Doneaux | |
| 4,221,299 | A | | 9/1980 | Taylor | |
| 4,238,035 | A | * | 12/1980 | Kassanchuk | 211/74 |
| 4,485,929 | A | | 12/1984 | Betts, Sr. | |
| 4,498,594 | A | | 2/1985 | Elder | |
| 4,512,489 | A | | 4/1985 | Green et al. | |
| 4,589,556 | A | * | 5/1986 | Peretz | 211/41.9 |
| 4,708,153 | A | | 11/1987 | Hambleton et al. | |
| 4,732,291 | A | | 3/1988 | McConnell | |
| 4,748,993 | A | * | 6/1988 | Llewellyn | 134/166 R |
| 4,830,200 | A | | 5/1989 | Zambano et al. | |
| 4,832,206 | A | * | 5/1989 | Cunningham | 211/41.9 |
| 4,836,392 | A | | 6/1989 | Constantino | |
| 4,917,248 | A | * | 4/1990 | Friskney | 211/41.8 |
| 4,928,841 | A | | 5/1990 | Arthurs | |
| 5,082,125 | A | * | 1/1992 | Ninni | 211/184 |
| 5,158,185 | A | * | 10/1992 | Michael et al. | 211/41.8 |
| 5,205,419 | A | * | 4/1993 | Purtilo | 211/41.8 |
| 5,242,255 | A | | 9/1993 | Gleffe et al. | |
| D342,191 | S | | 12/1993 | Cronk | |
| 5,287,636 | A | | 2/1994 | Lafleur et al. | |
| 5,351,837 | A | * | 10/1994 | Smith | 211/41.8 |
| 5,406,717 | A | | 4/1995 | Dofka | |
| 5,469,635 | A | | 11/1995 | Lamontagne et al. | |
| 5,480,035 | A | * | 1/1996 | Smith | 211/41.8 |
| 5,492,237 | A | | 2/1996 | Chang | |
| 5,497,890 | A | * | 3/1996 | Clark | 211/41.8 |
| 5,518,126 | A | * | 5/1996 | Davis | 211/41.8 |
| 5,601,195 | A | * | 2/1997 | Finola et al. | 211/41.8 |
| 5,649,630 | A | * | 7/1997 | Remmler | 211/41.8 |
| 5,875,563 | A | | 3/1999 | Snow | |
| 5,884,778 | A | | 3/1999 | Freiheit | |
| 5,913,527 | A | | 6/1999 | Hailston | |
| 6,073,783 | A | | 6/2000 | Allman | |
| 6,095,165 | A | * | 8/2000 | Mastronardi | 134/115 R |
| 6,334,540 | B1 | * | 1/2002 | Plutsky | 211/43 |
| 6,394,285 | B1 | * | 5/2002 | Arthurs et al. | 211/41.9 |
| 6,571,965 | B1 | * | 6/2003 | Beck et al. | 211/41.8 |
| 6,612,448 | B2 | * | 9/2003 | Plutsky | 211/43 |
| D488,594 | S | * | 4/2004 | Miilu et al. | D32/3 |
| D490,198 | S | * | 5/2004 | Jerstroem et al. | D32/55 |
| 6,877,616 | B2 | * | 4/2005 | Plutsky | 211/43 |
| 6,907,998 | B2 | * | 6/2005 | Deiss | 211/41.8 |
| D533,002 | S | * | 12/2006 | Recknagel et al. | D6/566 |
| 7,228,975 | B2 | * | 6/2007 | Yang et al. | 211/41.4 |
| 7,231,929 | B2 | * | 6/2007 | Landsiedel et al. | 134/135 |
| 7,344,036 | B2 | * | 3/2008 | Jerstroem et al. | 211/41.6 |
| D595,914 | S | * | 7/2009 | Housley | D32/55 |
| 7,644,826 | B2 | * | 1/2010 | Koch et al. | 211/41.4 |
| 7,682,465 | B2 | * | 3/2010 | Anderson et al. | 134/56 D |

FOREIGN PATENT DOCUMENTS

| | | |
|---|---|---|
| FR | 403288 | 10/1909 |
| GB | 12089 | 0/1915 |
| GB | 160098 | 5/1920 |
| GB | 174267 | 11/1920 |
| GB | 160098 | 3/1921 |

OTHER PUBLICATIONS

Product Literature of Mommy's Helper, Inc. entitled "Drain 'N Dry Bottle Drying Rack," 1996.*

Product Literature of Safety 1st entitled "Bottle & Nipple Drying Rack," 1996.

Product Literature of Safety 1st entitled "Bottle & Nipple Drying Rack", 1996.

Product Literature of Mommy's Helper, Inc. entitled "Drain 'N Dry Bottle Drying Rack", 1996.

* cited by examiner

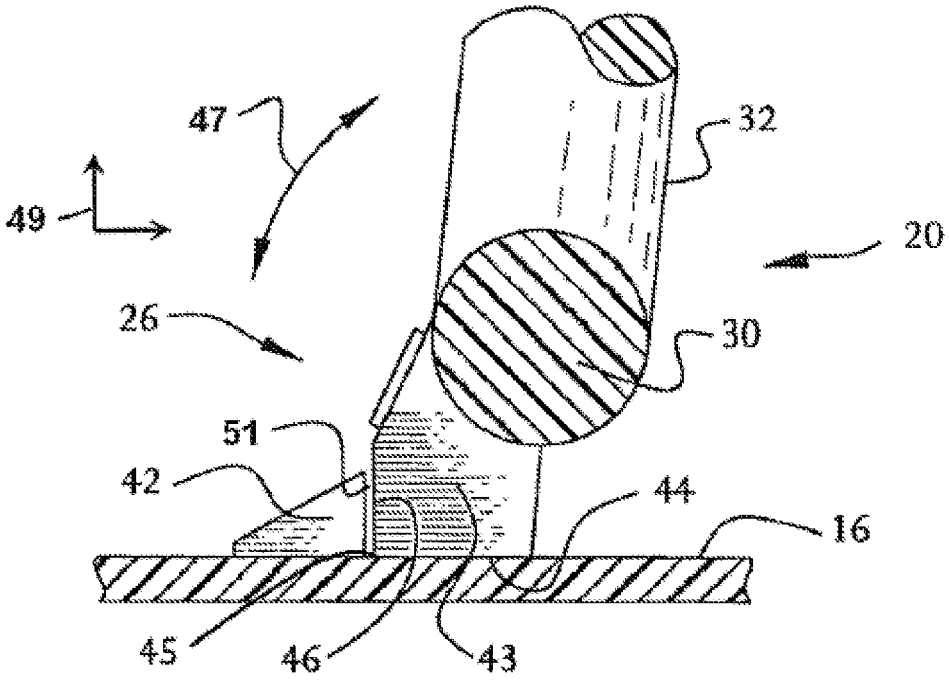
FIG. 4
AMENDED

BOTTLE RACK

Matter enclosed in heavy brackets [ ] appears in the original patent but forms no part of this reissue specification; matter printed in italics indicates the additions made by reissue.

This is a continuation of Ser. No. 09/113,868, filed on Jul. 10, 1998, U.S. Pat. No. 6,038,784, the disclosure of which is hereby incorporated as if fully set forth herein.

BACKGROUND OF THE INVENTION

1. Field of the Invention

This invention pertains generally to the field of infant feeding and care. More specifically, this invention relates to an improved apparatus for storing and drying infant nursing bottles, nipples and rings that is more hygienic, efficient and attractive than articles that are presently available for similar purposes, and that is more convenient to store for consumers.

2. Description of the Related Technology

The importance of proper hygiene when handling and cleaning infant feeding equipment such as baby bottles and nursing nipples cannot be overstated. Ideally, bottles and nipples should be thoroughly scrubbed, then sterilized by immersion in boiling water between uses. At the very least, baby bottles and components thereof, which typically include rings, nipples, hoods and disks, must be washed with an effective detergent and dried in a location that is separated from dirty water or potential contaminants prior to storage for future use.

Drying racks for holding baby bottles, rings and nipples after washing are commercially available. For example, such products are sold by Safety 1$^{st}$, Inc. as a "Bottle and Nipple Drying Rack," and by Mommy's Helper, Inc. as a "Drain 'N Dry." Both of these products are characterized by a plastic tray that has a number of socket recesses defined in a top face thereof. Plastic pegs are provided that are insertable into the socket recesses. Some of the plastic pegs are relatively long, for supporting a bottle, while others are shorter, for supporting nipples, rings and caps. Neither these products nor any other drying rack of which the inventors are aware have any way of storing the disks of a baby bottle in a sanitary location after washing.

Although products of the type described above are quite useful, the lack of disk storage forces conscientious caregivers to separate baby bottle components after washing and rinsing, which can be frustrating and can result in mix-ups between disks that have been washed and unwashed disks. In addition, the sockets that are defined in the top faces of such products can collect water and become points of nucleation for bacteria and mold growth. Furthermore, assembly and disassembly of these products can be laborious, with the need to insert multiple pegs in matching sockets and having to figure out which peg to place in each socket. These products are not convenient to store for a consumer, unless they are completely disassembled. In households that have toddlers, such racks can quickly unbeknownst to the caregiver become a plaything, and pegs can be pulled from the sockets, creating more work and frustration for the caregiver, possibly presenting a risk of injury.

A need exists for a bottle rack that requires minimal or no assembly by the user, that provides a secure and sanitary drying location for all baby bottle components, that minimizes the potential for mold and bacteria growth during use and is easy to store.

SUMMARY OF THE INVENTION

Accordingly, it is an object of the invention to provide a bottle rack that requires minimal or no assembly by the user, that provides a secure and sanitary drying location for all baby bottle components, that minimizes the potential for mold and bacteria growth during use and that is easy to store.

In order to achieve the above and other objects of the invention, an apparatus for drying and storing an article, such as a baby bottle includes a tray having a bottom face that is adapted to be supported by an underlying surface such as a counter-top, and an upper face; and a plurality of pegs extending outwardly away from the upper face, each of the pegs being sized and arranged so as to be able to support an article, such as a baby bottle, and wherein the pegs are pivotally mounted to the tray in such a manner as to be movable between a first storage position, wherein said entire peg is positioned relatively close to said upper face for storage and packaging of said apparatus, and a second, operative position, wherein the peg is positioned at a large angle with respect to the upper surface, so as to enable the peg to support an article such as a baby bottle, wherein the apparatus can conveniently be folded for packaging and storage purposes.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 is a cross-sectional view taken along lines 4-4 in FIG. 1.

DETAILED DESCRIPTION OF THE PREFERRED EMBODIMENT(S)

Figure 1:
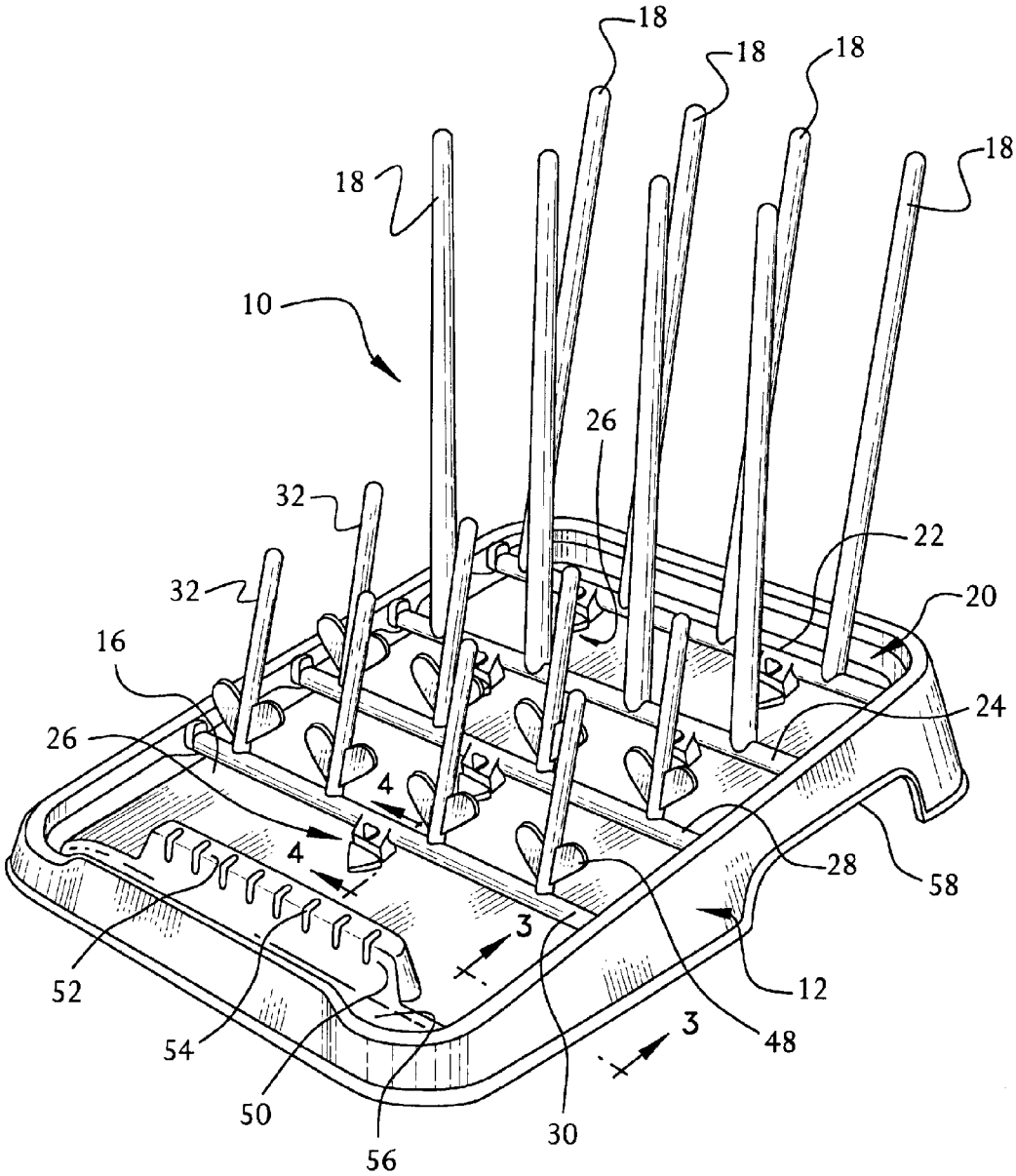
FIG. 1 is a perspective view of an apparatus that is constructed according to a preferred embodiment of the invention, shown in an operative position.

Referring now to the drawings, wherein like reference numerals designate corresponding structure throughout the views, and referring in particular to FIG. 1, an apparatus 10 for drying and storing an article, such as a baby bottle, after washing and rinsing includes a tray 12 having a bottom face 14 (viewable in FIG. 3) that is adapted to be supported by an underlying surface such as a countertop. Tray 12 further has an upper face 16, as may be seen in FIGS. 1-4. Tray 12 is further configured to have a number of cutout/grip areas 58 defined in sides thereof, as may best be seen in FIG. 1. The purpose of the cutout area 58 is to permit a consumer to more easily lift the apparatus 10 during use, as well as to prevent vapor lock from occurring between the apparatus 10 and a smooth underlying surface such as a countertop. In the preferred embodiment, a cutout area 58 is positioned on each side of the apparatus 10, as well as on the rear end thereof.

Figure 2:
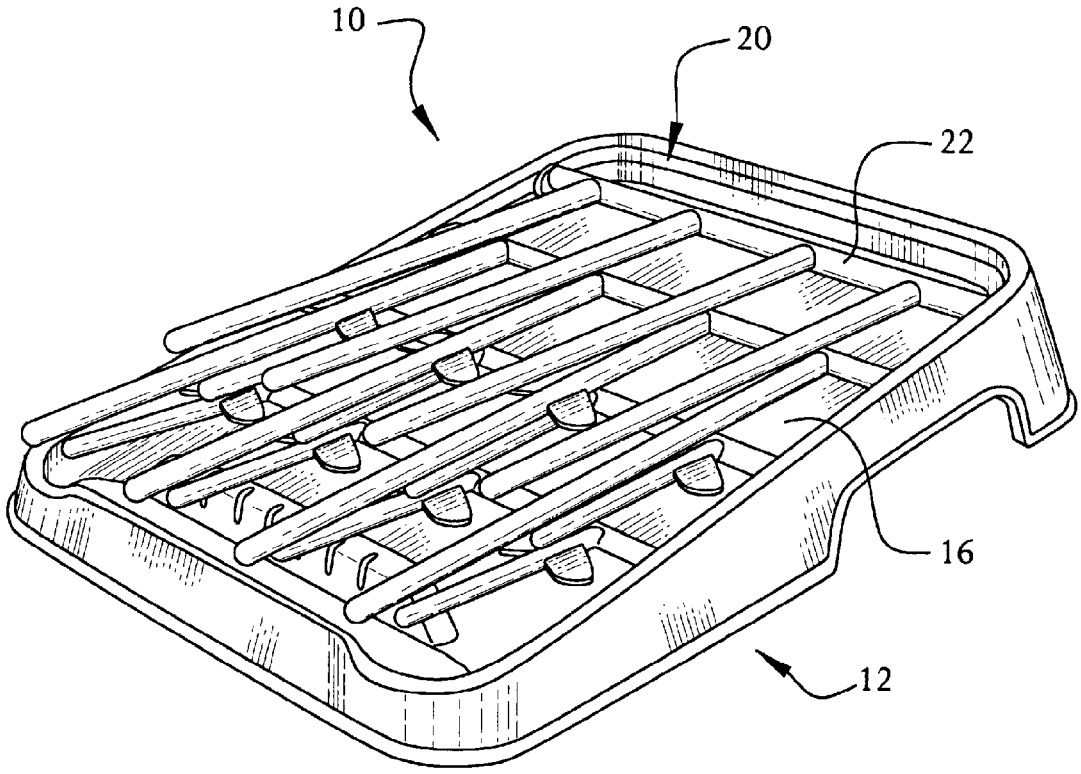
FIG. 2 is a perspective view of the apparatus of FIG. 1, shown in a storage position.

As is best shown in FIGS. 1 and 2, apparatus 10 further includes a plurality of pegs 18 that extend outwardly from the upper face 16 of tray 12. Each of the pegs 18 is sized and arranged so as to be able to support an article, such as a baby bottle, after washing and rinsing.

Figure 3:
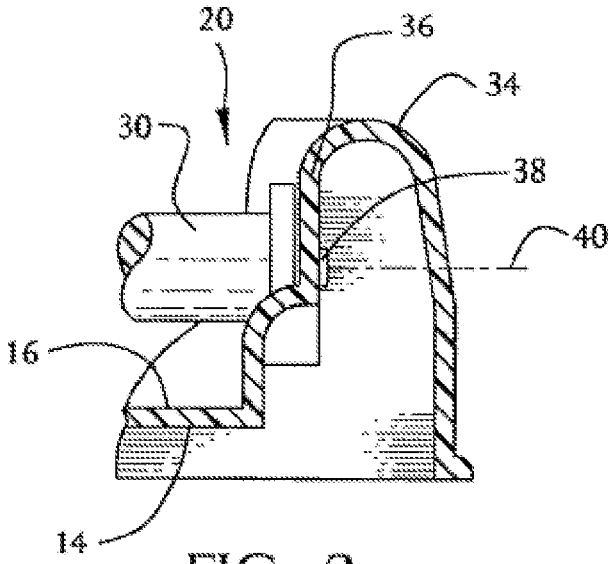
FIG. 3 is a cross-sectional view taken along lines 3-3 in FIG. 1.

According to one important aspect of the invention, each of the pegs 18 are permanently mounted to the tray 12 in such a manner as to be moveable between a first storage position, which is illustrated in FIG. 2, wherein the entire peg 18 is positioned relatively close to the upper face 16 for storage and packaging, and a second, operative position, illustrated in FIG. 1, wherein the pegs 18 are positioned at a large angle with respect to the upper surface 16. This mounting arrangement is made possible by a permanent mounting structure 20, which is best illustrated in FIGS. 1, 3 and 4, and which will be discussed in greater detail below. The permanent mounting structure 20, as will become apparent from the description given below, is constructed in such a way that no standing water may collect at a point where a peg 18 is mounted, thereby minimizing potential for mold and bacterial growth. Permanent mounting structure 20 is further constructed so as to constrain the pegs 18 for movement about only a single axis of rotation.

As may be seen in FIG. 1, apparatus 10 further includes a number of [nipple] *ring* support members 32 that are constructed and arranged to support a nipple portion of a baby bottle after washing and rinsing. The [nipple] *ring* support members 32 are, in a manner that is substantially identical to that of the pegs 18, mounted by means of a permanent mounting structure 20 for movement between a first storage position, where the entire [nipple] *ring* support member 32 is positioned relatively close to the upper face 16 for storage and packaging purposes, and a second, operative position where the [nipple] *ring* support member 32 is positioned at a large angle with respect to the upper face 16. In other words, the mounting structure 20 for the pegs 18 is substantially identical to that of the [nipple] *ring* support members 32. The [nipple] *ring* support members 32 have stylized stops 48, which in the preferred embodiment are styled as hearts, mounted thereon for supporting rings or small bottles above the surface of tray 12.

Looking again to FIG. 1, it will be seen that in the illustrated embodiment of the invention four pegs 18 are constrained for common, ganged movement [in an arc] about a common axis of rotation that is created by a first axle 22. Similarly, a second four pegs 18 are mounted for common movement with a second axle 24. Four [nipple] *ring* support members 32 are mounted for common movement about a third axle 28, while a second four [nipple] *ring* support members 32 are mounted for common movement with a fourth axle 30. In the preferred embodiment, the axles 22, 24, 28, 30 are substantially parallel, and therefore define arcuate paths of movement for the various pegs 18 and [nipple] *ring* support members 32 that are located within substantially parallel planes. This permits the various pegs 18 and [nipple] *ring* support members 32 to move between the first and second positions, as represented by FIGS. 2 and 1, respectively, with a minimum of interference with each other.

Looking now to FIG. 3, it will be seen that each axle 22, 24, 28, 30 includes a journal 38 that extends through a mounting hole that is defined in a sidewall 36 of an upstanding dam 34 that is formed along the periphery of the upper face 16 of the tray 12. A significant vertical distance exists between the bottom of the mounting hole and the top face 16 of the tray 12, so that water cannot escape through the mounting holes onto an underlying surface during normal use of the apparatus 10. This mounting structure 20 is arranged in such a way so as to constrain the axle 22, 24, 28, 30 for movement about an axis of rotation 40, as is shown in FIG. 3.

Mounting structure 20, by ganging adjacent pegs 18 and adjacent [nipple] *ring* support members 32 together by use of a common axle, thereby imparts lateral stability to the pegs 18 and the [nipple] *ring* support members 32, further deterring any motion other than about the single axis of rotation 40. *Accordingly, the pegs 18 are constrained to move in a predetermined plane of rotation 49.*

As may best be seen in FIGS. 1 and 4, each axle 22, 24, 28, 30 includes at least one locating structure 26, the purpose of which is to lock the respective axle in a rotational position that corresponds to the second operative position shown in FIG. 1. In the illustrated embodiment, first and second axles 22, 24 include two such locating structures 26, while the third and fourth axles 28, 30 which support the shorter [nipple] *ring* support members 32, are equipped with but one locating structure 26. The construction of the locating structures 26, however, is uniform throughout the four axles 22, 24, 28, 30. As may be seen in FIG. 4, locating structure 26 includes a cam member 43 having a lower surface 44 that is constructed and arranged to bear against the upper face 16 of tray 12, and a forward surface 46 that is constructed and arranged to come into contact with a rear surface 44 of a cam stop 42 that projects upwardly and is unitary with the upper face 16 of tray 12. FIG. 1 and FIG. 4 both depict the locking structure 26 in the second, operative position. The path between the first and second positions is indicated in FIG. 4 by arrow [46] *47*. The [nipple] *ring* support member 32 is prevented from bending backwardly in the direction away from the first storage position by contact of the forward surface 46 of cam member 43 with the rear surface [44] *51* of cam stop 42.

If it is desired to move the [nipple] *ring* support member 32 from the second, operative position shown in FIG. 1 to the first storage position shown in FIG. 2, a user will push the [nipple] *ring* support member 32 in the desired direction. Initially, this movement will be deterred by the *frictional* contact of the lower surface 44 and the leading edge *45* of the lower surface with the upper face 16 of tray 12. Once the leading edge 45 has cleared the upper face, however, the [nipple] *ring* support member 32 will easily fold down into the position that is shown in FIG. 2.

According to another important aspect of the invention, apparatus 10 further includes a [disc] *disk* holding system 50 for holding baby bottle [discs] *disks* in a location that is isolated from areas of the tray 12 in which liquid may collect. This allows baby bottle [discs] *disks* to be dried and stored in a safe manner at a location that is convenient to a location at which baby bottles are being dried. In the preferred embodiment, [disc] *disk* holding system 50 includes an upstanding boss member 52 that projects upwardly from the upper face 16 of tray 12 and has a plurality of [disc] *disk* receiving slots 54 defined therein. Boss member 52 and slots 54 are raised with respect to an underlying reservoir 56 that is located in the forward portion of tray 12. As an added benefit, the reservoir space also acts as a finger space area for a user to get his/her fingers beneath the [disc] *disk* members for lifting them out after drying.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

[1. An apparatus for supporting an article, comprising:

a tray having a bottom face that is adapted to be supported by an underlying surface, and an upper face; and a plurality of pegs extending outwardly away from said upper face, each of said pegs being sized and arranged so as to be able to support an article, and wherein said pegs are pivotally mounted to said tray in such a manner as to be movable between a first storage position and a second, operative position, wherein each of said pegs is positioned at a large angle with respect to said upper surface, so as to enable said peg to support an article, wherein said apparatus can conveniently be folded for packaging and storage purposes.]

[2. An apparatus for supporting an article, comprising:

a tray having a bottom face that is adapted to be supported by an underlying surface, and an upper face; and a plurality of pegs extending outwardly from said upper face, each of said pegs being sized and arranged so as to be able to support an article, and wherein each of said pegs are mounted to said tray in such a manner as to be movable between a first storage position, wherein each peg is folded so at least a portion thereof is positioned relatively close to said upper face, and a second, operative position, wherein each peg is positioned at a large angle with respect to said upper surface, so as to enable said peg to support an article, wherein said apparatus can conveniently be folded.]

[3. An apparatus according to claim 2, wherein said pegs are pivotally mounted to said tray.]

[4. An apparatus according to claim 3, wherein said pegs are permanently pivotally mounted to said tray.]

*5. An apparatus for supporting baby bottles and related accessories for drying, comprising:*

*a tray having a bottom portion that is adapted to be supported by an underlying surface, an upper portion and at least two sidewalls;*

*a plurality of pegs extending outwardly from said upper portion, each of said pegs being sized and arranged so as to be able to support a baby bottle; and*

*at least one axle for mounting said pegs for common arcuate movement between a first storage position, wherein said entire peg is positioned adjacent to said upper portion for storage and packaging of said apparatus, and a second, operative position, wherein said peg is positioned so as to extend outwardly from said upper portion, said axle being mounted for rotation within a pair of opposed journal holes that are defined in said sidewalls, said journal holes being elevated with respect to said upper portion of said tray so as not to receive water from said upper portion of said tray, and further comprising*

*location means connected to said axle for locking said pegs in said second, operative position.*

*6. An apparatus according to claim 5, wherein said location means comprises a cam member connected to said axle having a first surface that contacts a cam stop surface that is defined in said upper face of said tray.*

*7. An apparatus according to claim 6, wherein said cam stop surface is elevated with respect to adjacent areas of said upper face of said tray.*

*8. An apparatus according to claim 6, wherein said frictional means comprises a second surface on said cam member, said second surface being constructed and arranged to bear against the upper face of said tray when said peg is moved between said first storage position and said second operative position.*

* * * * *